United States Patent
Chen et al.

(10) Patent No.: US 11,906,939 B2
(45) Date of Patent: Feb. 20, 2024

(54) LUBRICATING OIL VOLUME ADJUSTMENT SYSTEM AND LUBRICATING OIL VOLUME ADJUSTMENT METHOD

(71) Applicant: Industrial Technology Research Institute, Hsinchu (TW)

(72) Inventors: Yi-Ming Chen, Taichung (TW); Tian-You Hou, Kaohsiung (TW); Shu-Chung Liao, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 302 days.

(21) Appl. No.: 17/198,270

(22) Filed: Mar. 11, 2021

(65) Prior Publication Data

US 2022/0197228 A1 Jun. 23, 2022

(30) Foreign Application Priority Data

Dec. 21, 2020 (TW) .................................. 109145316

(51) Int. Cl.
*G05B 13/04* (2006.01)
*G05B 13/02* (2006.01)
(Continued)

(52) U.S. Cl.
CPC ......... *G05B 13/041* (2013.01); *G05B 13/027* (2013.01); *G06N 3/044* (2023.01); *G06N 3/08* (2013.01)

(58) Field of Classification Search
CPC .... G05B 13/041; G05B 13/027; G06N 3/044; G06N 3/08; G06N 3/045; G06N 3/084; G06Q 10/0631; G06F 18/214
See application file for complete search history.

(56) References Cited

U.S. PATENT DOCUMENTS 6,622,824 B2 9/2003 Roehrborn
9,938,866 B2 * 4/2018 Borek ..................... F01M 1/16
(Continued)

FOREIGN PATENT DOCUMENTS

CN 1923399 3/2007
CN 109340358 2/2019
(Continued)

*Primary Examiner* — Eric J Yoon
*Assistant Examiner* — Tameem D Siddiquee
(74) *Attorney, Agent, or Firm* — JCIPRNET

(57) ABSTRACT

A lubricating oil volume adjustment system and a lubricating oil volume adjustment method are provided. The system includes a storage device and a processor and is connected to a machine including a motor through a data acquisition device acquiring current information of the motor. The storage device stores a machine learning model trained by a training data set including a plurality of pieces of the current information of the motor during operation and a plurality of temperature values measured during operation of the machine. The processor is configured to acquire the current information of present operation of the motor by using the data acquisition device, predict a temperature value of the machine when the motor operates under the current information by using the machine learning model, and calculate and adjust a lubricating oil volume suitable to be used by the machine during operation according to the predicted temperature value.

12 Claims, 5 Drawing Sheets

(51) Int. Cl.
    *G06N 3/08*         (2023.01)
    *G06N 3/044*      (2023.01)

(56)               References Cited

U.S. PATENT DOCUMENTS

| | | | |
|---|---|---|---|
| 2010/0166352 A1* | 7/2010 | Morita | F16C 33/667 |
| | | | 384/462 |
| 2019/0101032 A1* | 4/2019 | Graf | F01M 11/0004 |
| 2020/0016776 A1* | 1/2020 | Guo | F16N 11/00 |
| 2021/0383160 A1* | 12/2021 | Vander Neut | G06F 18/2413 |

FOREIGN PATENT DOCUMENTS

| | | |
|---|---|---|
| CN | 109654359 | 4/2019 |
| CN | 109826687 | 5/2019 |
| CN | 111612242 | 9/2020 |
| CN | 111895075 | 11/2020 |
| JP | S58211024 | 12/1983 |
| TW | M413798 | 10/2011 |
| TW | I460033 | 11/2014 |
| TW | I669582 | 8/2019 |
| WO | 2014081281 | 5/2014 |

* cited by examiner

```
┌─────────────────────────────────────────────────────────┐
│ calculating a heat dissipation feature parameter of     │
│ natural heat dissipation of a machine by using at least │
│ one heat dissipation-related parameter of the machine   │──S601
│ and a measured temperature change of the machine in a   │
│ cooling stage in which the machine stops operating and  │
│ supply of lubricating oil stops                         │
└─────────────────────────────────────────────────────────┘
                            ↓
┌─────────────────────────────────────────────────────────┐
│ calculating a heat influence parameter of an influence  │
│ of a used lubricating oil volume on heat dissipation of │
│ the machine by using at least one heat dissipation-     │
│ related parameter of the lubricating oil, a measured    │──S602
│ temperature value change of the machine, and the        │
│ calculated heat dissipation feature parameter in a      │
│ standby stage in which the machine stops operating and  │
│ the lubricating oil is supplied                         │
└─────────────────────────────────────────────────────────┘
                            ↓
┌─────────────────────────────────────────────────────────┐
│ calculating a relationship function between the         │
│ lubricating oil volume used by the machine during       │
│ operation and a temperature change of the machine by    │
│ using at least one operation parameter of operation of  │──S603
│ the machine, the calculated heat dissipation feature    │
│ parameter, and the heat influence parameter in a        │
│ heating stage in which the machine is operating and the │
│ lubricating oil is supplied                             │
└─────────────────────────────────────────────────────────┘
                            ↓
┌─────────────────────────────────────────────────────────┐
│ the relationship function is configured to calculate    │
│ the lubricating oil volume suitable to be used by the   │──S604
│ machine during operation under the predicted            │
│ temperature value                                       │
└─────────────────────────────────────────────────────────┘
```

LUBRICATING OIL VOLUME ADJUSTMENT SYSTEM AND LUBRICATING OIL VOLUME ADJUSTMENT METHOD

CROSS-REFERENCE TO RELATED APPLICATION

This application claims the priority benefit of Taiwanese application serial no. 109145316, filed on Dec. 21, 2020. The entirety of the above-mentioned patent application is hereby incorporated by reference herein and made a part of this specification.

BACKGROUND

Technical Field

The disclosure relates to a lubricating oil volume adjustment system and a lubricating oil volume adjustment method.

Description of Related Art

In a conventional oil supply system, oil is mainly acquired with a fixed volume at a fixed time because the system is not connected to machine data. Nevertheless, in practice, in a crankshaft stamping press, a motor is used to drive the crankshaft, and the swing frequency of the crankshaft is determined by the stroke of the solid slider. When the stroke decreases, the swing frequency increases, the temperature of the machine rises rapidly, and the volume of oil required by the machine accordingly increases.

With the advancement of servo technology, some machines are now equipped with the automatic lubrication system capable of adjusting various processing modes and automatically providing appropriate volumes of lubricating oil to lubricate the components of the machines. Nevertheless, the volume of the lubricating oil provided by the automatic lubrication system is usually designed with a margin (over design). That is, the automatic lubrication system usually adopts the most stringent processing conditions for lubricating oil supply. Excessive lubricating oil is supplied most of the time, and problems such as lubricating oil waste and recycling are generated as a result.

SUMMARY

The disclosure provides a lubricating oil volume adjustment system and a lubricating oil volume adjustment method capable of effectively supplying a lubricating oil volume suitable to be used by a machine during operation.

The disclosure provides a lubricating oil volume adjustment system including a storage device and a processor and connected to a machine through a data acquisition device. The machine includes a motor. The data acquisition device acquires current information of the motor. The storage device stores a machine learning model, and the machine learning model is trained by a training data set including a plurality of pieces of the current information of the motor during operation and a plurality of temperature values measured during operation of the machine. The processor is coupled to the data acquisition device and the storage device to acquire the current information of present operation of the motor by using the data acquisition device, to predict a temperature value of the machine when the motor operates under the current information by using the machine learning model, and to calculate and adjust the lubricating oil volume suitable to be used by the machine during operation according to the predicted temperature value.

The disclosure further provides a lubricating oil volume adjustment method suitable for adjusting a lubricating oil volume used by a machine during operation through an electronic device, and the lubricating oil volume adjustment method includes the following steps. Current information of present operation of a motor of the machine is acquired. A temperature value of the machine when the motor operates under the current information is predicted by using a machine learning model. The machine learning model is trained by a training data set including a plurality of pieces of the current information of the motor during operation and a plurality of temperature values measured during operation of the machine. A lubricating oil volume suitable to used by the machine during operation is calculated and adjusted according to the predicted temperature value.

To sum up, in the lubricating oil volume adjustment system and the lubricating oil volume adjustment method provided by the disclosure, the temperature value of the machine when the motor operates under the specific current information may be predicted by using machine learning. Further, the lubricating oil volume suitable to be used by the machine during operation is calculated and adjusted, and in this way, the lubricating oil volume suitable to be used by the machine during operation is supplied.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6 is a flow chart of calculation of a lubricating oil volume suitable to be used by the machine during operation according to a predicted temperature value according to an exemplary embodiment of the disclosure.

DESCRIPTION OF THE EMBODIMENTS

Figure 1:
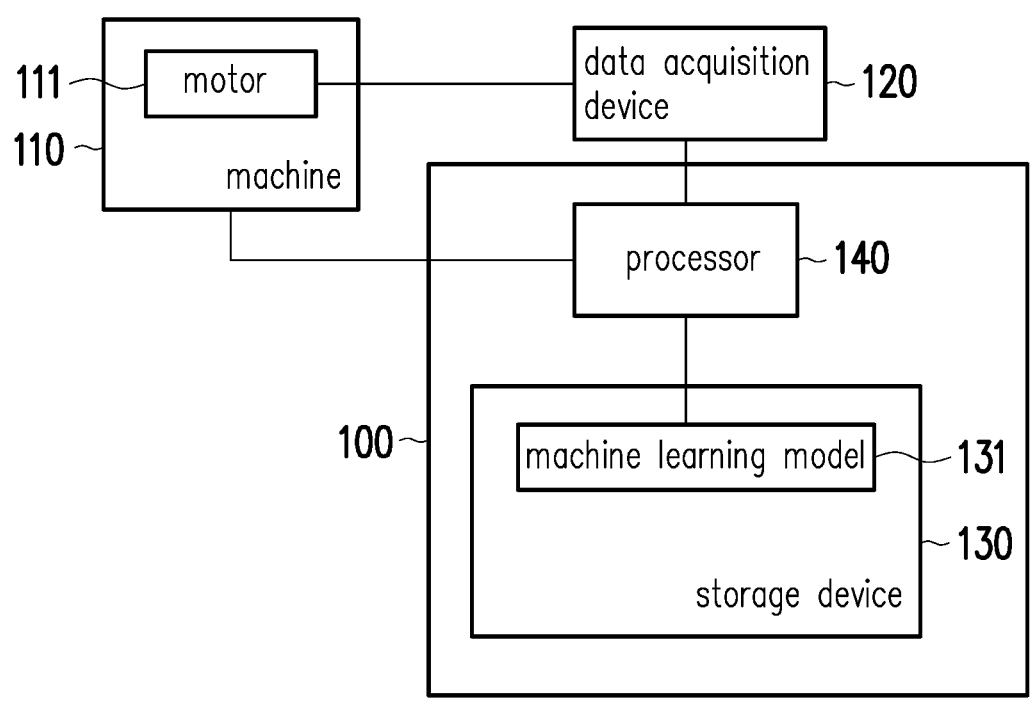
FIG. 1 is a schematic view of a lubricating oil volume adjustment system according to an exemplary embodiment of the disclosure.

FIG. 1 is a schematic view of a lubricating oil volume adjustment system 100 according to an exemplary embodiment of the disclosure. With reference to FIG. 1, the lubricating oil volume adjustment system 100 includes a storage device 130 and a processor 140. The lubricating oil volume adjustment system 100 is connected to a machine 110 through a data acquisition device 120. The lubricating oil volume adjustment system 100 may be an electronic apparatus such as an independent computer or a controller of the machine 100.

The machine 110 includes, but not limited to, a stamping press including the motor 111 or other machine tools or mechanical equipment that need to be lubricated or cooled with lubricating oil, for example.

The data acquisition device 120 is a wired connection device such as a universal serial bus (USB), an RS232, a universal asynchronous receiver/transmitter (UART), an internal integrated circuit (I2C), a serial peripheral interface (SPI), a display port, a thunderbolt, or a local area network (LAN) interface or a wireless connection device supporting wireless fidelity (Wi-Fi), RFID, Bluetooth, infrared, near-field communication (NFC), or device-to-device (D2D) communication protocol. The data acquisition device 120 is coupled to the motor 111 and is configured to acquire current information of the motor 111.

The storage device 130 is, for example, a fixed or movable random access memory (RAM) in any form, a read-only memory (ROM), a flash memory, a hard disk or a similar device, or a combination of these devices and is configured to store a program which may be executed by the processor 140. In some embodiments, the storage device 130 may store a machine learning model 131. The machine learning model 131 is, for example, a convolutional neural network (CNN), a recurrent neural network (RNN), or a long short term memory (LSTM) recurrent neural network, which is not limited by the disclosure.

The processor 140 is coupled to the data acquisition device 120 and the storage device 130 to control operation of the lubricating oil volume adjustment system 100. In some embodiments, the processor 140 is, for example, a central processing unit (CPU) or a programmable microprocessor for general or special use, a digital signal processor (DSP), a programmable controller, an application specific integrated circuit (ASIC), a field programmable gate array (FPGA), a programmable logic controller (PLC), or other similar devices or a combination of these devices and may be loaded to execute a program stored in the storage device 130 to execute a lubricating oil volume adjustment method provided by the embodiments of the disclosure.

Figure 2:
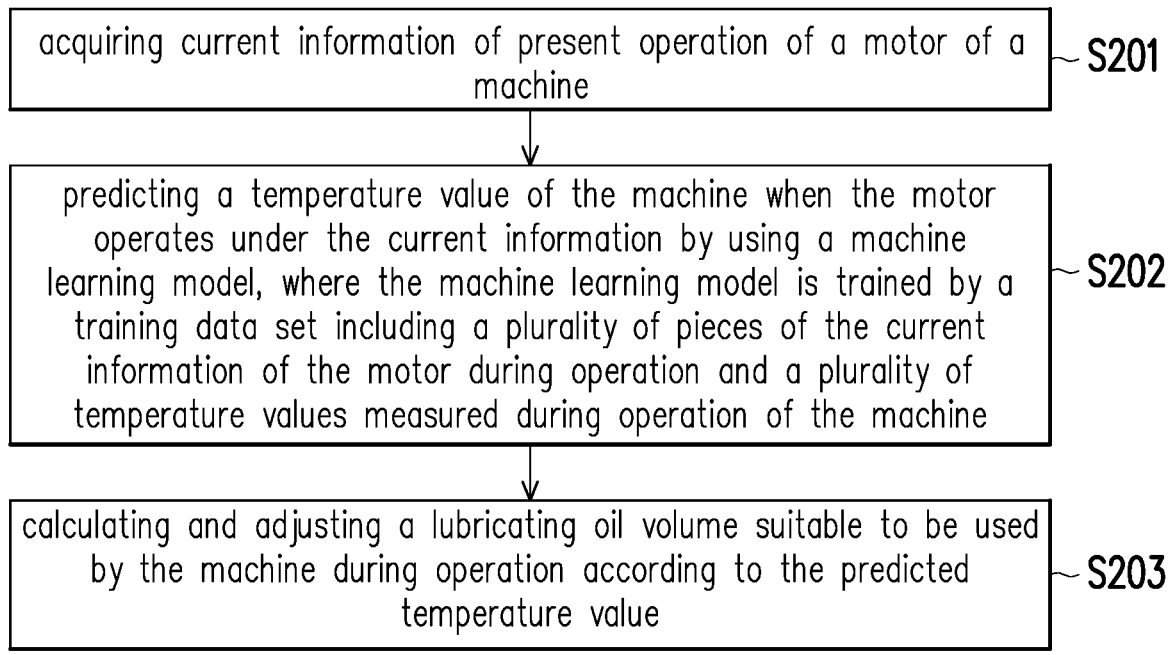
FIG. 2 is a flow chart of a lubricating oil volume adjustment method according to an exemplary embodiment of the disclosure.

FIG. 2 is a flow chart of a lubricating oil volume adjustment method according to an exemplary embodiment of the disclosure. With reference to FIG. 1 and FIG. 2 together, the method provided by this embodiment is suitable for the lubricating oil volume adjustment system 100 of FIG. 1, and steps of the lubricating oil volume adjustment method of the disclosure are described in detail together with elements of the lubricating oil volume adjustment system 100.

In step S201, the processor 140 may be configured to acquire the current information of present operation of the motor 111 of the machine 110 by using the data acquisition device 120.

In step S202, the processor 140 may be configured to predict a temperature value of the machine 110 when the motor 111 operates under the current information by using the machine learning model 131. The machine learning model 131 is trained by a training data set including a plurality of pieces of the current information of the motor 111 during operation and a plurality of temperature values measured during operation of the machine 110.

For instance, Table 1 is an example of the training data set, and content of training data shown in Table 1 is merely exemplary, which is not limited by the disclosure. At a time point $T_1$, the processor 140 may acquire the current information (e.g., 1.5 amperes) of the motor 111 during operation by using the data acquisition device 120 and treats this current information and a measured temperature value (e.g., 20° C.) of the machine 110 during operation at the time point $T_1$ as training data 1. At a time point $T_2$, the processor 140 may acquire the current information (e.g., 2 amperes) of the motor 111 by using the data acquisition device 120 and treats this current information and the measured temperature value (e.g., 22° C.) of the machine 110 during operation at the time point $T_2$ as training data 2. The rest may be deduced by analogy, and the training data set including a plurality of pieces of the training data may thus be obtained. In some embodiments, the processor 140 may be configured to calculate a root mean square (RMS) value of the current information acquired in a time segment before the current information is treated as the training data.

TABLE 1

| Training Data | Time Point | Current Information | Temperature Value |
|---|---|---|---|
| 1 | $T_1$ | 1.5 amperes | 20° C. |
| 2 | $T_2$ | 2 amperes | 22° C. |
| 3 | $T_3$ | 2.5 amperes | 25° C. |
| ... | ... | ... | ... |

Figure 3:
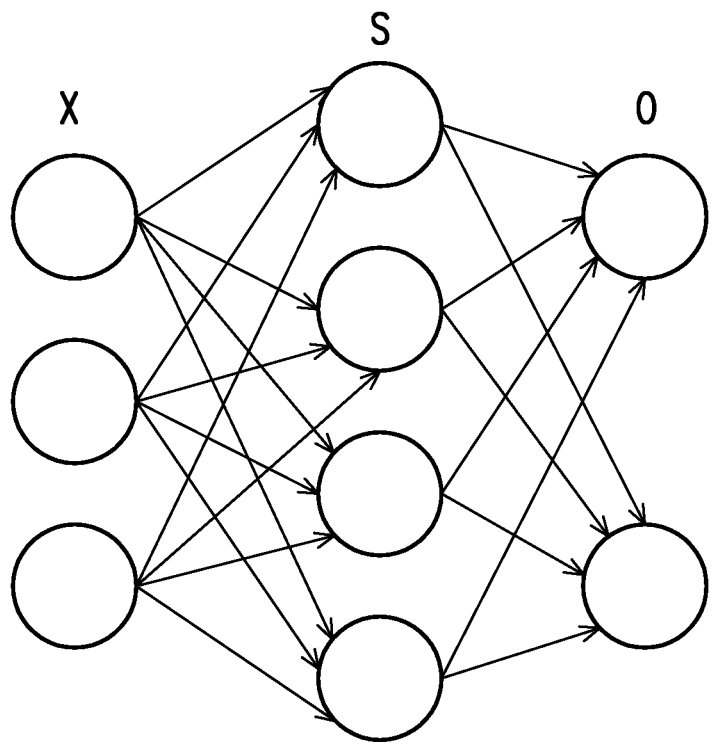
FIG. 3 is a schematic view of a machine learning model according to an exemplary embodiment of the disclosure.

FIG. 3 is a schematic view of the machine learning model 131 according to an exemplary embodiment of the disclosure. With reference to FIG. 3, the machine learning model 131 provided by this embodiment includes calculation layers such as an input layer X, a hidden layer S, and an output layer O, and each of the calculation layers may include a plurality of neurons. In other embodiments, the machine learning model 131 may include a plurality of hidden layers, and numbers of the neurons contained in calculation layers may be different, which is not limited herein.

Figure 4:
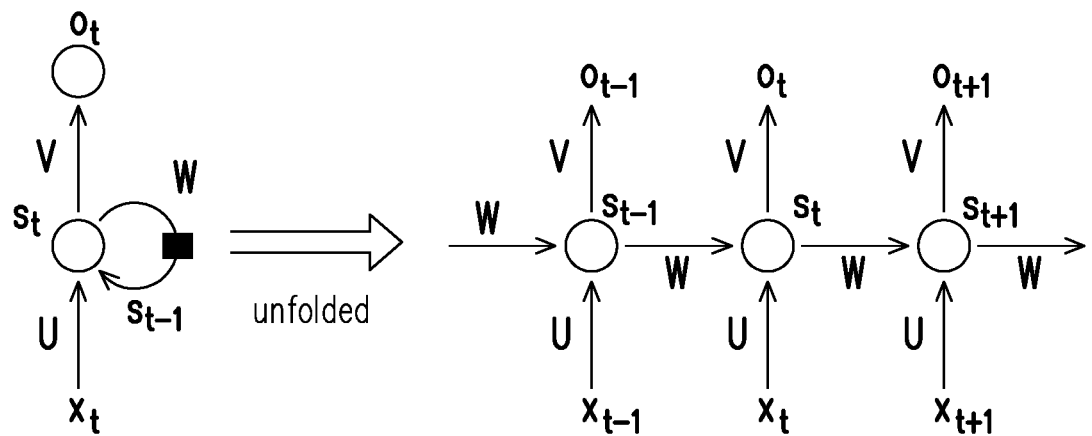
FIG. 4 is a schematic view of a recurrent neural network (RNN) according to an exemplary embodiment of the disclosure.

In some embodiments, the machine learning model 131 adopts an RNN suitable for processing time series data exhibiting a precedence relationship. FIG. 4 is a schematic view of an RNN according to an exemplary embodiment of the disclosure. With reference to FIG. 3 and FIG. 4 together, an RNN 131a provided by this embodiment is an implementation manner of the machine learning model 131 of FIG. 3, and calculation thereof is sequential. In particular, in the RNN 131a, the training data of the hidden layer S comes from two sources, one is output data x of the input layer X, and the other one is a previous calculation result $s_{t-1}$ from the hidden layer S. Herein, U, V, and W are weights used by the hidden layer S during calculation, and a calculation manner is described in detail in latter paragraphs. When the RNN 131a is unfolded, it may be seen that a final result $o_{t+1}$ at time (t+1) is a result of input at that time together with all history data. Accordingly, modeling of a time series may be achieved by the RNN 131a, which is in line with continuous processing of a stamping press.

With reference to the following formulas 1 and 2, when calculation of the hidden layer S is performed, the processor 140 may be configured to treat present (time point t) output $x_t$ of the input layer X and previous output $s_{t-1}$ of the hidden layer S as present input of the hidden layer S. Present output $s_t$ of the hidden layer S is calculated by using an activation function $f_1$ through the neurons of the hidden layer S, and the output $s_t$ of the hidden layer S is converted into output $o_t$ by using an activation function $f_2$ through the output layer O, where U, V, and W are weights, and $b_s$ and $b_o$ are offset values.

$$s_t = f_1(Ux_t + Ws_{t-1} + b_s) \quad \text{(Formula 1)}$$

$$o_t = f_2(Vs_t + b_o) \quad \text{(Formula 2)}$$

In some embodiments, $x_t$ is the current information at the time point t, $s_{t-1}$ is output of the hidden layer S at a time point t−1, $s_t$ is output of the hidden layer S at the time point t, $o_t$ is a predicted temperature value of output of the output layer O at the time point t, the activation function $f_1$ is, for example, an S (sigmoid) function or a hyperbolic tangent (tanh) function, and the activation function $f_2$ is, for example, a normalized exponential (softmax) function, but is not limited thereto.

In some embodiments, the processor 140 may, for example, input the current information of the training data in Table 1 into the machine learning model 131, and predicted temperature values shown in Table 2 are thus obtained. At this time, the processor 140 may be configured to compare the predicted temperature values to measured temperature values and updates the weights of the neurons in the hidden layer S according to comparison results. In some embodiments, the processor 140 may be configured to calculate a loss function by using the predicted temperature value and the (actually measured) temperature value outputted by the machine learning model 131 to evaluate whether a prediction result of the machine learning model 131 is accurate and to accordingly update the weights of the neurons of the hidden layer S. In other embodiments, the processor 140 may be configured to update the weights of the neurons of the hidden layer S through gradient descent (GD) or back-propagation (BP), which is not limited by the disclosure.

TABLE 2

| Training Data | Time Point | Current Information | Predicted Temperature Value | Temperature Value |
|---|---|---|---|---|
| 1 | $T_1$ | 1.5 amperes | 18° C. | 20° C. |
| 2 | $T_2$ | 2 amperes | 20° C. | 22° C. |
| 3 | $T_3$ | 2.5 amperes | 23° C. | 25° C. |
| ... | ... | ... | ... | ... |

After the weights of the neurons of the hidden layer S are updated, the processor 140 may be configured to repeat the foregoing steps (i.e., performing calculation by using formulas 1 and 2 and comparing the predicted temperature value to the measured temperature value to update the weights) to train the machine learning model 131.

After training of the machine learning model 131 is completed, the processor 140 may predict the temperature value of the machine 110 when the motor 111 operates under this current information by using the (trained) machine learning model 131.

With reference to FIG. 2 again, after the predicted temperature value is obtained (step S202), in step S203, the processor 140 may be configured to calculate and adjust a lubricating oil volume suitable to be used by the machine 110 during operation according to the predicted temperature value, and implementation thereof is provided in the following embodiments.

Figure 5:
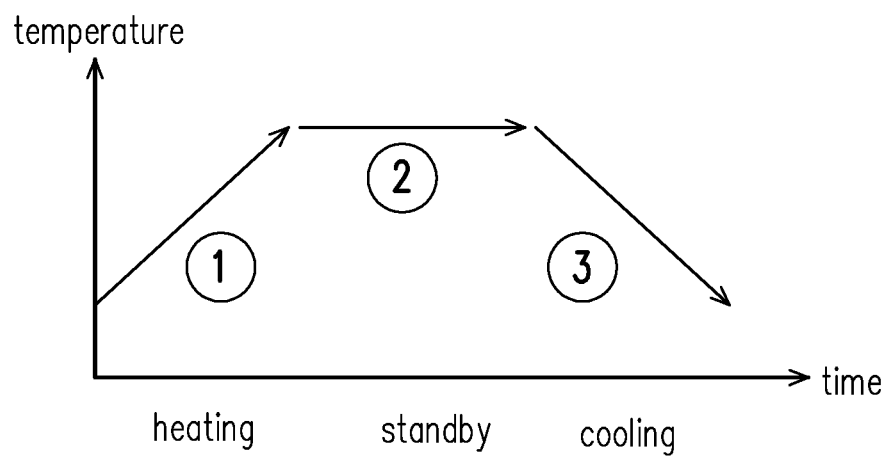
FIG. 5 is a schematic graph of different stages of a machine according to an exemplary embodiment of the disclosure.

FIG. 5 is a schematic graph of different stages of operation of the machine 110 according to an exemplary embodiment of the disclosure. With reference to FIG. 5 and Table 3, operation of the machine 110 may be divided into three stages according to whether the machine 110 is operating or whether lubricating oil is supplied. Herein, a cooling stage is a stage in which the machine 110 stops operating and supply of the lubricating oil stops. The standby stage is a stage in which the machine 110 stops operating and the lubricating oil is supplied. The heating stage is a stage in which the machine 110 is operating and the lubricating oil is supplied.

TABLE 3

| Operation Stage | Machine State | Lubrication State | Purpose |
|---|---|---|---|
| Heating Stage | operating | oil supplied | power inputting |
| Standby Stage | stopped | oil supplied | lubricating cooling/heating capacity |
| Cooling Stage | stopped | oil supply stopped | heat dissipation capacity |

FIG. 6 is a flow chart of calculation of the lubricating oil volume suitable to be used by the machine during operation according to the predicted temperature value according to an exemplary embodiment of the disclosure. With reference to FIG. 1 and FIG. 6 together, the method provided by this embodiment is suitable for the lubricating oil volume adjustment system 100 of FIG. 1, and steps of the lubricating oil volume adjustment method of the disclosure are described in detail together with elements of the lubricating oil volume adjustment system 100.

In step S601, in the cooling stage, the processor 140 may be configured to calculate a heat dissipation feature parameter of natural heat dissipation of the machine 110 by using at least one heat dissipation-related parameter of the machine 110 and a measured temperature change of the machine 110.

With reference to the following formulas 3 to 5, in some embodiments, the heat dissipation-related parameter of the machine 110 may include a thermal conductivity coefficient h, a machine surface area A, a machine density ρ, a machine specific heat capacity $C_p$, or a machine volume V. In the cooling stage, the machine 110 stops operating and supply of the lubricating oil stops, so frictional heat $W_\mu$ and cooling (lubricating) heat $W_c$ are both 0, and total heat W in formula 3 and total heat W in formula 5 are both 0. The processor 140 may be configured to calculate a heat dissipation feature parameter m of natural heat dissipation of the machine 110 according to formula 4 by using measured temperature changes of the machine 110 at different time points as well as thermal conductivity coefficient h of the machine 110, the machine surface area A, the machine density ρ, the machine specific heat capacity $C_p$, and the machine volume V.

$$W = W_\mu + W_c \quad \text{(Formula 3)}$$

$$m = \frac{hA}{\rho C_p V} \quad \text{(Formula 4)}$$

$$\dot{T}(t) = mT(t) - mT_\infty(t) - \frac{W}{\rho C_p V} \quad \text{(Formula 5)}$$

Herein, W is the total heat, $W_\mu$ is the frictional heat, $W_c$ is the cooling (lubricating) heat, and in the embodiments of the disclosure, $W_c$ is also called as a heat influence parameter.

In step S602, in standby stage, the processor 140 may be configured to calculate the heat influence parameter of an influence of the used lubricating oil volume on heat dissipation of the machine 110 by using the at least one heat dissipation-related parameter of the lubricating oil, a measured temperature value change of the machine 110, and the calculated heat dissipation feature parameter.

With reference to the following formula 6, in some embodiments, the heat dissipation-related parameter of the lubricating oil may include an oil volume M or a specific heat capacity s. In the standby stage, the machine 110 stops operating and the lubricating oil is supplied, the frictional heat $W_\mu$ is 0 and the cooling (lubricating) heat $W_c$ is not 0 in formula 3, so the processor 140 may be configured to calculate the heat influence parameter $W_c$ by using formula 6.

$$W_c = Ms\Delta T_c \qquad \text{(Formula 6)}$$

Herein, M is the lubricating oil volume, s is the specific heat capacity, and $\Delta T_c$ is a temperature difference.

In step S603, in the heating stage, the processor 140 may be configured to calculate a relationship function between the lubricating oil volume used by the machine 110 during operation and the temperature change of the machine 110 by using at least one operation parameter of operation of the machine 110, the calculated heat dissipation feature parameter m, and the heat influence parameter $W_c$.

With reference to the following formula 7, in some embodiments, the at least one operation parameter of operation of the machine 110 may include a coefficient of friction η, a stamping pressure F, a diameter d, a surface area of friction πdL, or a number of stamping per minute n. In the heating stage, the machine 110 is operating and the lubricating oil is supplied, so the frictional heat $W_\mu$ is not 0 and the cooling (lubricating) heat $W_c$ is not 0 in formula 3, and the processor 140 may be configured to deduce the complete relationship function (i.e., Ṫ(t) in formula 5) between the lubricating oil volume and the temperature change of the machine 110 after calculating the frictional heat $W_\mu$ by using formula 7.

$$W_\mu = \pi dL\eta Fn \qquad \text{(Formula 7)}$$

Herein, $W_\mu$ is the frictional heat, η is the coefficient of friction, F is the stamping pressure, d is the diameter, πdL is the surface area of friction, n is the number of stamping per minute.

In step S604, after the relationship function is calculated, the processor 140 may be configured to calculate the lubricating oil volume to be used by the machine 110 during operation under the predicted temperature value by using the relationship function. In other words, the processor 140 may calculate the lubricating oil volume suitable to be used by the machine 110 during operation according to the predicted temperature value by using the relationship function.

With reference to FIG. 2 again, in step S203, after the lubricating oil volume suitable to be used by the machine 110 during operation is calculated, the processor 140 may be configured to adjust the lubricating oil volume suitable to be used by the machine 110 during operation according to the calculated lubricating oil volume.

In some embodiments, besides the current information of operation of the motor which is treated as input of the machine learning model to train the machine learning model, the lubricating oil volume used by the machine during operation may also be treated as input to train the machine learning model. In this way, a relationship among the current information, the lubricating oil volume, and the temperature change is obtained.

Figure 7:
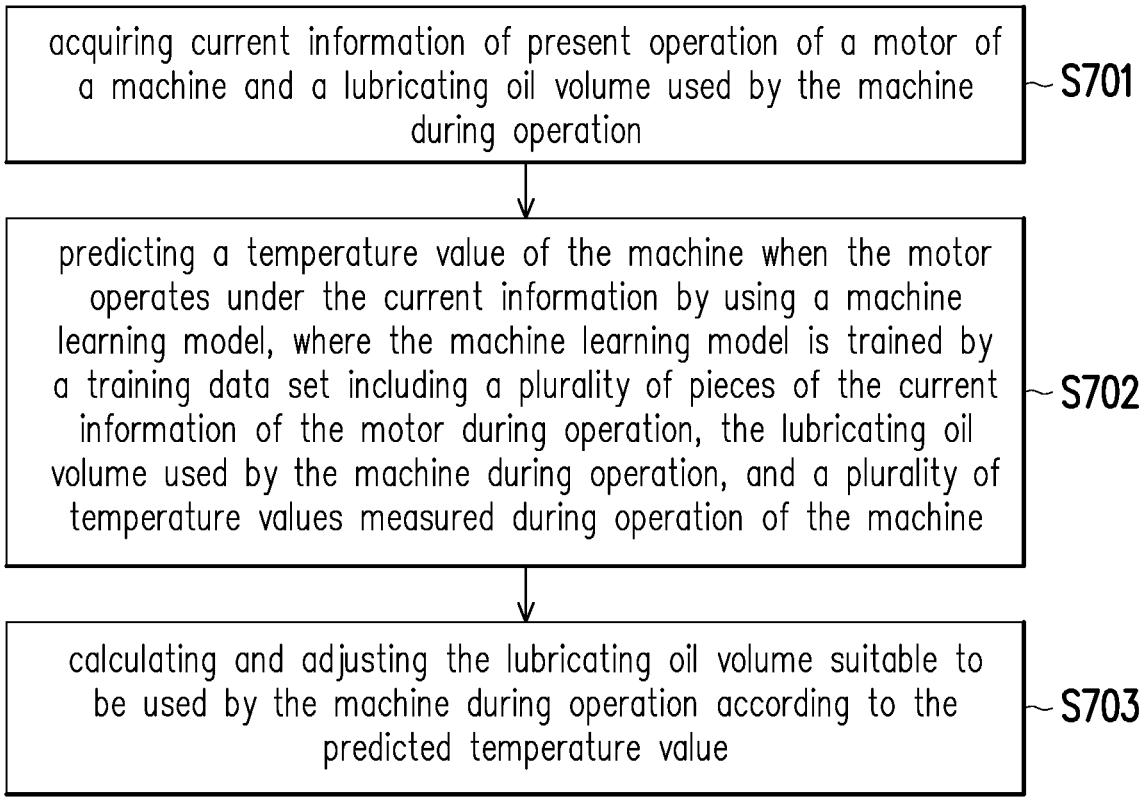
FIG. 7 is a flow chart of a lubricating oil volume adjustment method according to another exemplary embodiment of the disclosure.

To be specific, FIG. 7 is a flow chart of a lubricating oil volume adjustment method according to another exemplary embodiment of the disclosure. With reference to FIG. 1 and FIG. 7 together, the method provided by this embodiment is suitable for the lubricating oil volume adjustment system 100 of FIG. 1, and steps of the lubricating oil volume adjustment method of the disclosure are described in detail together with elements of the lubricating oil volume adjustment system 100.

In step S701, the processor 140 may be configured to acquire the current information of present operation of the motor 111 of the machine 110 and the lubricating oil volume used by the machine 110 during operation.

In step S702, the processor 140 may be configured to predict a temperature value of the machine 110 when the motor 111 operates under the current information by using the machine learning model 131. The machine learning model 131 is trained by a training data set including a plurality of pieces of the current information of the motor 111 during operation, the lubricating oil volume used by the machine 110 during operation, and a plurality of temperature values measured during operation of the machine 110.

In some embodiments, the data acquisition device 110 may acquire the lubricating oil volume used by the machine 110 during operation. Table 4 is another example of the training data set, and content of training data shown in Table 4 is merely exemplary, which is not limited by the disclosure. At the time point $T_1$, the processor 140 may acquire the current information (e.g., 1.5 amperes) of the motor 111 during operation as well as the lubricating oil volume (e.g., 200 grams) used by the machine 110 during operation by using the data acquisition device 120 and treats this current information, the lubricating oil volume, and a measured temperature value (e.g., 20° C.) of the machine 110 during operation at the time point $T_1$ as training data 1. At the time point $T_2$, the processor 140 may acquire the current information (e.g., 2 amperes) of the motor 111 during operation as well as the lubricating oil volume (e.g., 250 grams) used by the machine 110 during operation by using the data acquisition device 120 and treats this current information, the lubricating oil volume, and a measured temperature value (e.g., 22° C.) of the machine 110 during operation at the time point $T_2$ as training data 2. The rest may be deduced by analogy, and the training data set including a plurality of pieces of the training data may thus be obtained.

TABLE 4

| Training Data | Time Point | Current Information | Lubricating Oil Volume | Temperature Value |
|---|---|---|---|---|
| 1 | $T_1$ | 1.5 amperes | 200 grams | 20° C. |
| 2 | $T_2$ | 2 amperes | 250 grams | 22° C. |
| 3 | $T_3$ | 2.5 amperes | 300 grams | 25° C. |
| ... | ... | ... | ... | ... |

The processor 140 may be configured to adopt a structure of the RNN 131a shown in FIG. 4 to build the machine learning model 131 and trains the machine learning model 131 by using the training data set shown in Table 4. Different from the foregoing embodiments, in this embodiment, the processor 140 inputs the current information and the lubricating oil volume into the input layer of the machine learning model 131 according to the time series. The present (time point t) output $x_t$ (including the current information and the lubricating oil volume) of the input layer X and the previous output $s_{t-1}$ of the hidden layer S are treated as the present input of the hidden layer S. The present output $s_t$ of the hidden layer S is calculated by using the activation function $f_1$ through the neurons of the hidden layer S, and the output $s_t$ of the hidden layer S is converted into the predicted temperature value $o_t$ by using the activation function $f_2$ through the output layer O. Implementation thereof is identical to that provided by the embodiments of FIG. 4, and description thereof is not repeated herein.

In some embodiments, the processor 140 may, for example, input the current information and the lubricating oil volume of the training data in Table 4 into the machine learning model 131, and predicted temperature values shown in Table 5 are thus obtained. At this time, the processor 140 may be configured to compare the predicted temperature values to measured temperature values and updates the weights of the neurons in the hidden layer S according to comparison results. Herein, the processor 140 may update the weights of the neurons of the hidden layer S through calculating the loss function or by using GD or BP. Implementation thereof is identical to that provided by the embodiments of FIG. 4, and description thereof is not repeated herein.

TABLE 5

| Training Data | Time Point | Current Information | Lubricating Oil Volume | Predicted Temperature Value | Temperature Value |
|---|---|---|---|---|---|
| 1 | $T_1$ | 1.5 amperes | 200 grams | 22° C. | 20° C. |
| 2 | $T_2$ | 2 amperes | 250 grams | 21° C. | 22° C. |
| 3 | $T_3$ | 2.5 amperes | 300 grams | 26° C. | 25° C. |
| ... | ... | ... | ... | ... | ... |

After training of the machine learning model 131 is completed, the processor 140 may be configured to predict the temperature value of the machine 110 when the motor 111 operates under this current information by using the (trained) machine learning model 131.

In step S703, the processor 140 may be configured to calculate and adjust the lubricating oil volume suitable to be used by the machine 110 during operation according to the predicted temperature value. The processor 140 may calculate the lubricating oil volume suitable to be used by the machine 110 during operation by using, for example, the implementation provided by the embodiments of FIG. 6, and description of detailed content thereof is not repeated herein. After the lubricating oil volume suitable to be used by the machine 110 during operation is calculated, the processor 140 may be configured to adjust the lubricating oil volume suitable to be used by the machine 110 during operation according to the calculated lubricating oil volume.

In view of the foregoing, in the lubricating oil volume adjustment system and the lubricating oil volume adjustment method provided by the disclosure, the temperature change of the machine when the motor is operating is predicted by using machine learning. Further, the lubricating oil volume suitable to be used by the machine during operation is calculated. In this way, optimization of oil volume prediction and intelligent temperature control and lubrication are achieved. In particular, the machine learning model provided by the disclosure may be trained by using pieces of the current information, the lubricating oil volume, and the temperature value, the accuracy of temperature prediction is therefore improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A lubricating oil volume adjustment system, suitable for being connected to a machine through a data acquisition device, wherein the machine comprises a motor, the data acquisition device is coupled to the motor to acquire current information of the motor, and the lubricating oil volume adjustment system comprises:
an oil supply system, supplying a lubricating oil to the machine;
a storage device, storing a machine learning model, wherein the machine learning model is trained by a training data set comprising a plurality of pieces of the current information of the motor during operation and a plurality of temperature values measured during operation of the machine; and
a processor, coupled to the data acquisition device and the storage device, acquiring the current information of present operation of the motor by using the data acquisition device, predicting a temperature value of the machine when the motor operates under the current information by using the machine learning model, calculating and adjusting a lubricating oil volume suitable to used by the machine during operation according to the predicted temperature value, comprising:
calculating a heat dissipation feature parameter of natural heat dissipation of the machine by using at least one heat dissipation-related parameter of the machine and a measured temperature change of the machine in a cooling stage in which the machine stops operating and supply of the lubricating oil stops;
calculating a heat influence parameter of an influence of the used lubricating oil volume on heat dissipation of the machine by using at least one heat dissipation-related parameter of the lubricating oil, a measured temperature value change of the machine, and the calculated heat dissipation feature parameter in a standby stage in which the machine stops operating and the lubricating oil is supplied; and
calculating a relationship function between the lubricating oil volume used by the machine during operation and a temperature change of the machine by using at least one operation parameter of operation of the machine, the calculated heat dissipation feature parameter, and the heat influence parameter in a heating stage in which the machine is operating and the lubricating oil is supplied, wherein the at least one operation parameter of the machine comprises one of a coefficient of friction, a stamping pressure, a diameter, a surface area of friction, and a number of stamping per minute or a combination thereof, wherein
the relationship function is configured to calculate the lubricating oil volume suitable to be used by the machine during operation under the predicted temperature value; and
controlling the oil supply system to supply the lubricating oil to the machine according to the calculated lubricating oil volume.

2. The lubricating oil volume adjustment system according to claim 1, wherein the machine learning model comprises an input layer, a hidden layer, and an output layer, and the processor is further configured for:
inputting the current information into the input layer according to a time series,
treating present output of the input layer and previous output of the hidden layer as input of the hidden layer, calculating present output by using an activation function through a plurality of neurons of the hidden layer and converting the output of the hidden layer into a predicted temperature value through the output layer;

comparing the predicted temperature value to a temperature value measured at present and updating weights of the neurons of the hidden layer according to a comparison result; and repeating the steps to train the machine learning model.

3. The lubricating oil volume adjustment system according to claim 1, wherein the machine learning model comprises an input layer, a hidden layer, and an output layer, the data acquisition device further acquires the lubricating oil volume used by the machine during operation, and the processor is further configured for:

inputting the current information and the lubricating oil volume into the input layer according to a time series, treating present output of the input layer and previous output of the hidden layer as input of the hidden layer, calculating present output by using an activation function through a plurality of neurons of the hidden layer and converting the output of the hidden layer into a predicted temperature value through the output layer;

comparing the predicted temperature value to a temperature value measured at present and updating weights of the neurons of the hidden layer according to a comparison result; and repeating the steps to train the machine learning model.

4. The lubricating oil volume adjustment system according to claim 1, wherein the machine learning model comprises convolutional neural network (CNN), a recurrent neural network (RNN), or a long short term memory (LSTM) recurrent neural network.

5. The lubricating oil volume adjustment system according to claim 1, wherein the at least one heat dissipation-related parameter of the machine comprises one of a thermal conductivity coefficient, a machine surface area, a machine density, a machine specific heat capacity, and a machine volume or a combination thereof.

6. The lubricating oil volume adjustment system according to claim 1, wherein the at least one heat dissipation-related parameter of the lubricating oil comprises an oil volume and a specific heat capacity.

7. A lubricating oil volume adjustment method, suitable for adjusting a lubricating oil volume used by a machine during operation through an electronic device, and the lubricating oil volume adjustment method comprises:

acquiring current information of present operation of a motor of the machine;

predicting a temperature value of the machine when the motor operates under the current information by using a machine learning model, wherein the machine learning model is trained by a training data set comprising a plurality of pieces of the current information of the motor during operation and a plurality of temperature values measured during operation of the machine; and calculating and adjusting the lubricating oil volume suitable to be used by the machine during operation according to the predicted temperature value, comprising:

calculating a heat dissipation feature parameter of natural heat dissipation of the machine by using at least one heat dissipation-related parameter of the machine and a measured temperature change of the machine in a cooling stage in which the machine stops operating and supply of lubricating oil stops;

calculating a heat influence parameter of an influence of the used lubricating oil volume on heat dissipation of the machine by using at least one heat dissipation-related parameter of the lubricating oil, a measured temperature value change of the machine, and the calculated heat dissipation feature parameter in a standby stage in which the machine stops operating and the lubricating oil is supplied; and calculating a relationship function between the lubricating oil volume used by the machine during operation and a temperature change of the machine by using at least one operation parameter of operation of the machine, the calculated heat dissipation feature parameter, and the heat influence parameter in a heating stage in which the machine is operating and the lubricating oil is supplied, wherein the at least one operation parameter of the machine comprises one of a coefficient of friction, a stamping pressure, a diameter, a surface area of friction, and a number of stamping per minute or a combination thereof, wherein the relationship function is configured to calculate the lubricating oil volume suitable to be used by the machine during operation under the predicted temperature value; and controlling an oil supply system to supply the lubricating oil to the machine according to the calculated lubricating oil volume.

8. The lubricating oil volume adjustment method according to claim 7, wherein the machine learning model comprises an input layer, a hidden layer, and an output layer, and the lubricating oil volume adjustment method further comprises:

inputting the current information into the input layer according to a time series, treating present output of the input layer and previous output of the hidden layer as input of the hidden layer, calculating present output by using an activation function through a plurality of neurons of the hidden layer and converting the output of the hidden layer into a predicted temperature value through the output layer;

comparing the predicted temperature value to a temperature value measured at present and updating weights of the neurons of the hidden layer according to a comparison result; and repeating the steps to train the machine learning model.

9. The lubricating oil volume adjustment method according to claim 7, wherein the machine learning model comprises an input layer, a hidden layer, and an output layer, and the lubricating oil volume adjustment method further comprises:

acquiring the lubricating oil volume used by the machine during operation;

inputting the current information and the lubricating oil volume into the input layer according to a time series, treating present output of the input layer and previous output of the hidden layer as input of the hidden layer, calculating present output by using an activation function through a plurality of neurons of the hidden layer and converting the output of the hidden layer into a predicted temperature value through the output layer;

comparing the predicted temperature value to a temperature value measured at present and updating weights of the neurons of the hidden layer according to a comparison result; and repeating the steps to train the machine learning model.

10. The lubricating oil volume adjustment method according to claim 7, wherein the machine learning model comprises a convolutional neural network, a recurrent neural network, or a long short term memory recurrent neural network.

11. The lubricating oil volume adjustment method according to claim 7, wherein the at least one heat dissipation-related parameter of the machine comprises one of a thermal conductivity coefficient, a machine surface area, a machine density, a machine specific heat capacity, and a machine volume or a combination thereof.

12. The lubricating oil volume adjustment method according to claim 7, wherein the at least one heat dissipation-related parameter of the lubricating oil comprises an oil volume and a specific heat capacity.

* * * * *